United States Patent [19]
Vartti et al.

[11] Patent Number: 5,381,416
[45] Date of Patent: Jan. 10, 1995

[54] DETECTION OF SKEW FAULT IN A MULTIPLE CLOCK SYSTEM

[75] Inventors: Kelvin S. Vartti, Vadnais Heights; Gregory B. Wiedenman, Woodbury, both of Minn.

[73] Assignee: Unisys Corporation, Blue Bell, Pa.

[21] Appl. No.: 148,246

[22] Filed: Nov. 8, 1993

[51] Int. Cl.$^6$ ............................................. G06F 15/20
[52] U.S. Cl. .................................... 371/1; 375/108; 327/3; 327/292
[58] Field of Search ........................... 307/269; 371/1; 375/108

[56] References Cited

U.S. PATENT DOCUMENTS

| | | | |
|---|---|---|---|
| 3,699,261 | 10/1972 | Tomozawa | 375/116 X |
| 4,405,945 | 9/1983 | Sato | 348/530 |
| 5,278,651 | 1/1994 | Wada et al. | 358/149 |
| 5,329,188 | 7/1994 | Sikkink et al. | 307/517 |
| 5,337,321 | 8/1994 | Ozaki | 371/22.3 |

Primary Examiner—Edward R. Cosimano
Attorney, Agent, or Firm—Glenn W. Bowen; Mark T. Starr; Charles A. Johnson

[57] ABSTRACT

A skew fault detection system for detecting clock skew between two clock phases utilizes a plurality of skew fault detection circuits each of which employs two D-type flip-flops. The clock terminals of both of these flip-flops are connected to one of the clock phases, and one of the clock phases is coupled to a delay circuit on the D input terminal of one of the flip-flops. The delay circuit is adjustable to correspond to the clock pulse delay that is inherent in the circuit that is being monitored to control the maximum amount of clock skew that is allowable before this flip-flop will set. If the clock skew exceeds this allowable time, a skew fault occurs and the flip-flop will set. The circuit compares the initiation of one clock phase against the initiation of the other clock phase and to determine when the initiation of one clock phase occurs earlier than the initiation of the other clock pulse by a time duration that exceeds a predetermined allowable skew amount of time. Majority voting circuits may be employed to allow for detection failure of more than one skew fault detection circuit.

8 Claims, 4 Drawing Sheets

DETECTION OF SKEW FAULT IN A MULTIPLE CLOCK SYSTEM

FIELD OF THE INVENTION

The invention relates to error detection in clock systems for digital computers and more particularly in a computer system that utilizes two or more independently redundant clocks for fault tolerance purposes.

BACKGROUND OF THE INVENTION

Redundancy is a technique that is currently employed in digital computer systems to achieve fault tolerance. Redundant components, such as logic arrays, memory circuits and processors, have been used which are driven by a master clock for the system. A more effective fault tolerant computer system can be obtained if the redundant components of the computer system are divided into groups of elements, with each group having its own synchronized clock. In such a system, if a clock fails, a standby clock can be switched in to take its place. When redundant clocks are employed, they must remain synchronized within close tolerances. Excessive amounts of time that occur between the logic triggering edges of the two clocks which result in "skew faults" must be detected to insure that the clock system is operating properly. The present invention provides a novel implementation of skew fault detection which is suitable for redundant clock systems and which has self-checking capabilities that monitor the failure of component parts of the skew fault detection system.

SUMMARY OF THE INVENTION

A skew fault detection system is provided that is capable of detecting when either a first clock pulse from a first clock pulse train leads a second clock pulse from a second clock pulse train by a predetermined duration, or the second clock pulse leads the first clock by a predetermined duration. The two clock pulses are supplied from independent clocks and each of them supplied to one of two identical operational components that are operating in a redundant manner. Each of the operational components have at least two fan-out outputs. The skew fault detection circuits are divided into two groups each of which have an equal number of skew fault detection circuits. The skew fault detection circuits of both groups are coupled to receive both the first and second clock pulses from the first and second operational components and are constructed and coupled such that one group detects whenever the first clock pulses lead the second clock pulses by greater than a predefined amount, and the other group detects whenever the second clock pulses lead the first clock pulses by greater than a predefined amount. For high frequency clocks, clock frequency reduction circuits are coupled to the first and second clock sources to reduce the frequency of the clock pulses applied to the skew fault detection circuits. Majority voting circuits may also be employed to allow for the detection of certain failures off more than one skew fault detection circuit in a set of redundant skew fault detection circuits.

The skew fault detection circuits may each include first and second D-type flip-flops that are both initially in the same first state, and each of which a clock input and a data input and an output. The clock inputs of both of the flip-flops are coupled to receive a clock pulse from one clock pulse train. The data input of the first-flop is coupled to receive another clock pulse from the other clock pulse train. A logic circuit in the fault detection circuit has a first input coupled to an output of the first flip-flop, a second input coupled to an output of the second flip-flop, and an output coupled to the data input of the second flip-flop.

The logic circuit is constructed so that the first flip-flop changes to its second state upon the occurrence of a one clock pulse, the second flip-flop changes to its second state upon the occurrence of the next one clock pulse, the second flip-flop is locked-out from further changing its state until the second flip-flop receives an externally produced reset signal that is coupled to the second flip-flop from the logic circuit means.

A time delay may also be coupled to the data input of the first flip-flop for delaying another clock pulse phase to this input by a time that is determined by the allowable skew tolerance plus the nominal time it takes for the first flip-flop to change states.

BRIEF DESCRIPTION OF THE DRAWINGS

The invention is described by reference to the drawings in which.

DETAILED DESCRIPTION OF THE INVENTION

The skew fault detection circuit shown in the FIGS. 1A–10 is used to detect and report a fault when the allowable skew between one independent clock and another independent clock in a digital computer system has been violated. For purposes of this invention, "skew" is the amount of time between the triggering edges of 2 different clock signals that are intended to stay synchronized. If the clock synchronizer cannot keep the two clock signals synchronized, the skew fault detection system must recognize this, and in turn stop the distribution of the faster clock, and desirably send a fault message to the computer system which will allow the system to switch to an operational standby clock.

Figures 1, 1B:
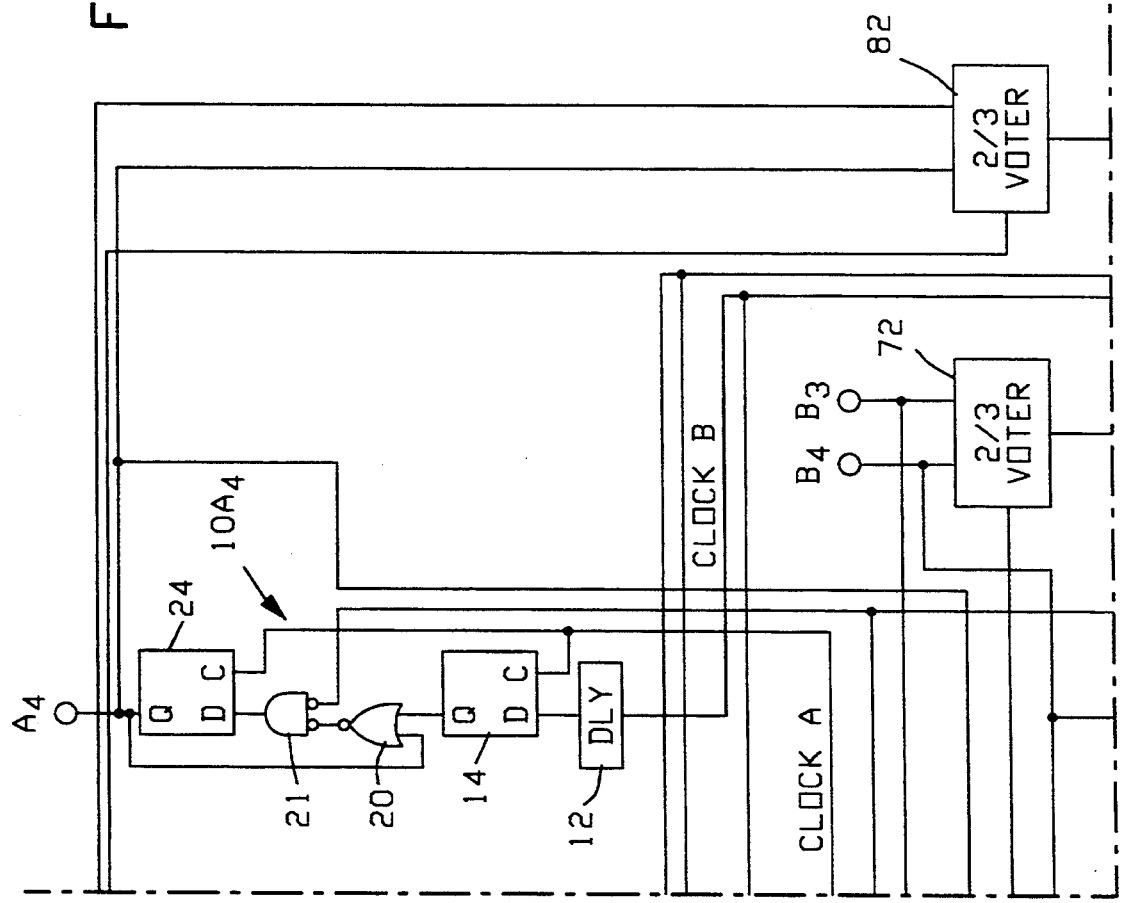
FIG. 1 is a map that shows how
FIGS. 1A–1D are to be positioned with respect to each other, and FIGS. 1A–1D form a block diagram of a clock detection system that utilizes the invention.
Figure 1A:
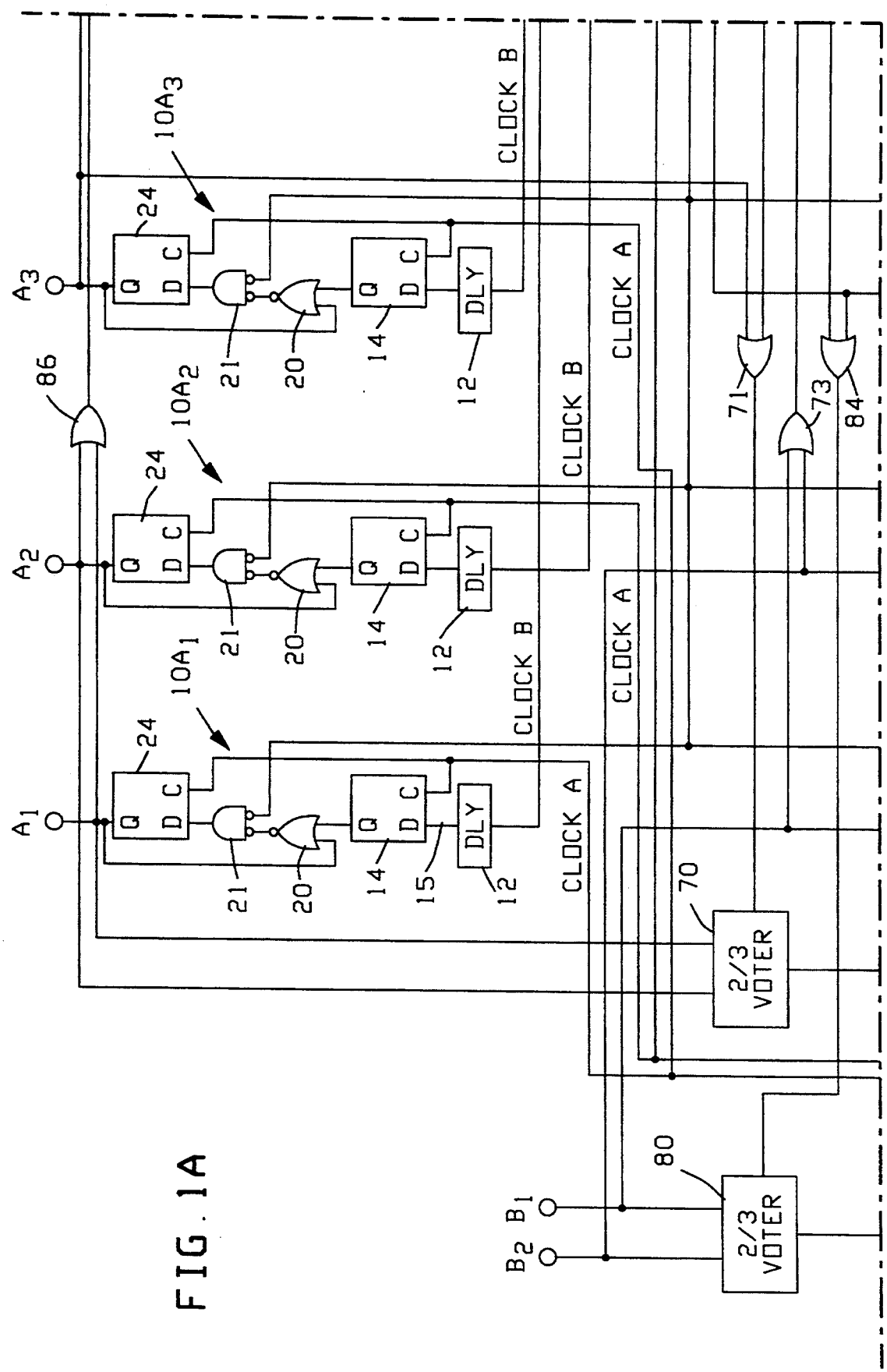
Figure 1C:
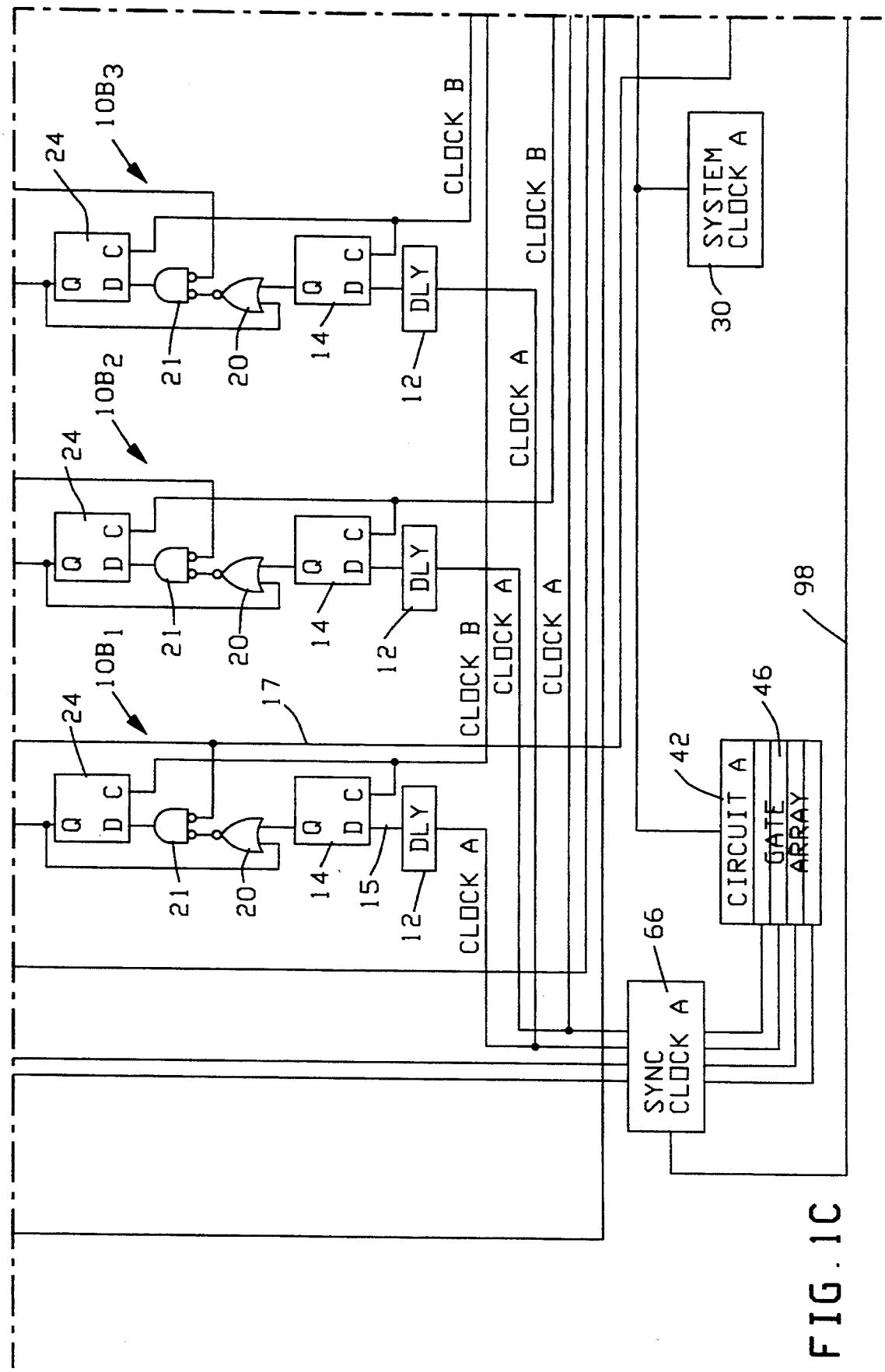
Figure 1D:
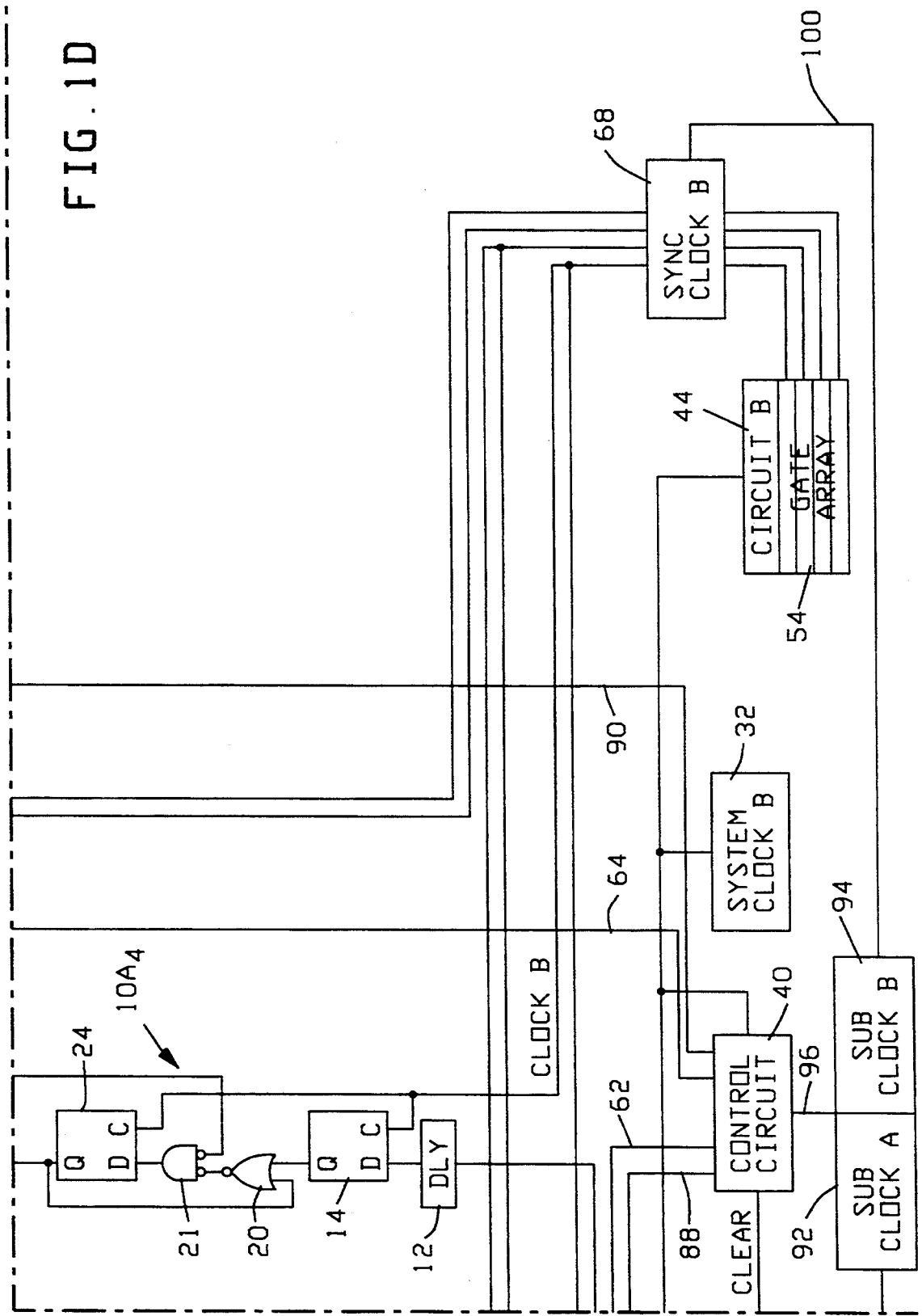

The skew fault detectors $10A_1$–$A_4$ of FIGS. 1A and 1B and $10B_1$–$10B_4$ of FIGS. 1C and 1D are constructed to respond very fast to any skew errors. The first stage of each circuit consists of a delay element 12 and a flip-flop 14 that will detect an unacceptable clock skew. The circuit also includes components for latching the skew fault detection signal and for clearing the fault upon receipt of an external clear signal.

The two system clock signals, clock A and clock B from system clock A circuit 30 and system clock B circuit 32, are supplied as inputs to a skew fault detection circuit on the lines clock A and clock B, respectively. For example, referring to skew fault detection circuit $10A_1$, clock A is fed into the clock input C of the D-type or delay-type flip-flop 14 on the line 11, and clock B is fed into the delay circuit 12 on the line 13 which is in turn connected to the data input D of the flip-flop 14 on the line 15. Because of the delay circuit 12, the delayed clock (hereinafter DCLKB) will lag behind the clock A input by the time determined by the delay circuit. This delay time is determined by taking into account the length of signal lines on foil that is routed to an array of pins that are external to the components that are driven by clock B, as for example, from a gate array. DCLKB will be delayed enough so that the rising edge of the clock m will not be within the allowable clock skew plus the setup time for the flip-flop 14 with respect to the rising edge of the clock A pulse.

If clock B starts to lead clock A by more than the allowable skew, (for example, by more than 2.5 nanoseconds (ns) in a representative system), DCLKB will begin to overlay the triggering edge of clock A. In other words, DCLKB to the data input D will be high at the same time that clock A clocks flip-flop 14. Therefore, when clock A activates the clock on flip flop 14, the data input D will no longer be at a low level, and the output of flip-flop 14 will go to a high level.

When the output Q of the flip-flop 14 is set to a high level, it causes the output of the NOR gate 20 which has an input connected to the output Q of the flip-flop 14 to go to a low level, and thus will put a low level at the input of a second NOR gate 21 which is implemented as an AND gate with logical inversions on its two inputs. The other input of the NOR gate 21 will also be low since the normal state of the clear error signal is low. The NOR gate will then produce a high level at the D terminal of the output flip-flop 24.

On the next low-to-high transition of clock A, which is coupled to its clock terminal C, the Q output of the flip-flop 24 will go high which indicates that a skew error has occurred. This high level skew error signal is also routed to the second input of the NOR gate 20, which holds the output of the NOR gate 20 in a low state and the output of the NOR gate 21 output at a high state, which causes flip-flop 24 to latch the skew error indicating condition. The skew detector will remain in this latched state until a high level clear error is sent via the clear error signal on the line 17. An implementation with two identical operational circuits 42, 44 that are shown in FIGS. 1C and 1D, respectively, includes two separate identical gate arrays 46 and 54. The circuit 42 is driven by system clock A circuit 30, and the circuit 44 is driven by system clock B circuit 32. The clocks A and B are identical, and in the event of failure a substitute clock (not shown) could be switched in by a control circuit, such as the control circuit 40, to replace the failed clock in a manner by those skilled in the art.

One of the important factors in a system in which two independent clocks are employed is that the two clocks must be closely synchronized. It is impossible have the clocks identically synchronized, especially when the clocks which are running at extremely high rates, such as now employed in modern high speed computers. For example, if a system clock is operated at 80 Mhz, the pulse period is only 12.5 nanoseconds (ns) which makes synchronization very difficult. In the present embodiment D-type flip-flops are employed to detect the skew or synchronization error between the separate clock phases provided by the system clock A and clock B circuits 30, 32. If the system clocks are divided down to a lower frequency, such as 10 Mhz, and the duty cycle is modified so that the "on time" of each clock is only a fraction of the total pulse period, reliable skew detection can be achieved by the present invention. For example, a duty cycle on the order of 6.25 percent may be utilized. Sync clock A circuit 66 and sync clock B circuit 68 provide the lower frequency clocks by conventional frequency dividing techniques. It is the outputs of the sync clock circuits 66 and 68 that are fed to the skew detectors on the lines labelled "CLOCK A" and "CLOCK B". With these sync clocks the detection flip-flops will have sufficient time to settle to a logic level after being triggered.

Reference to the FIGS. 1A-1D shows that the skew fault detection circuits $10A_1$-$10A_4$ all have the clock A signal from the sync clock A circuit 66 applied to the clocking terminals of their respective flip-flops 14. The delay terminals, or data terminals D of these flip-flops have the clock B signal from the sync clock B circuit 68 supplied to them through a delay circuit 12. Thus, the skew fault detection circuits $10A_1$-$10A_4$ detect when the clock B signal is faster than the clock A signal by the allowed skew of 2.5 ns. On the other hand, the skew fault detection circuits $10B_1$-$10B_4$ have the reverse connections so that the clock B signals feed the clock, or C, input, while the clock A signals are supplied through the delay circuit 12 to their data, or D, input terminals. Thus, the skew detectors $10B_1$-$10B_4$ will detect when the clock A circuit is faster than the clock B circuit by the allowed skew of 2.5 ns.

The skew fault detection circuits $10A_1$, $10A_2$, $10B_1$ and $10B_2$ may be located on the same circuit card. Similarly, the skew fault detection circuits $10A_3$, $10A_4$, $10B_3$ and $10B_4$ may all be located on a second circuit card. Thus, each circuit card will contain two skew fault detection circuits for determining if the sync A clock is faster than the sync B clock, and two skew fault detection circuits for determining if the sync B clock is faster than the sync A clock.

The Q output of the latch flip-flops 24 of the skew fault detection circuits $10A_1$ and $10A_2$ are supplied to a two-out-of-three voter circuit 70. The other input of the two-out-of-three voter circuit 30 is obtained from the OR gate 71, which has input coupled to the Q output of the flip-flops 24 of the skew fault detection circuits $10A_3$ and $10A_4$.

A second two-out-of-three voter circuit 72 is coupled to the outputs of the skew fault detection circuits $10B_3$ and $10B_4$. A third input to the two-out-of-three voter circuits 72 is supplied by the OR gate 73 which receives inputs from the Q output of the flip-flops 24 and the skew fault detection circuits $10B_1$ and $10B_2$.

A third identical voter circuit 80 receives direct inputs from the skew fault detection circuits $10B_1$ and $10B_2$ while its third input is supplied from the OR gate 84 which receives its inputs from the skew fault detection circuits $10B_3$ and $10B_4$.

There is also a fourth identical voter circuit 82 which is coupled to receive direct inputs from the skew fault detection circuits $10A_3$ and $10A_4$ and its third input from the OR gate 86 which has its inputs coupled to the Q outputs of the flip-flops 24 of the skew fault detection $10A_1$ and $10A_2$.

With these circuit arrangements, all of the voter circuits 70, 72, 80 and 82 will correctly supply a skew fault signal on their respective output lines 62, 64, 88 or 90 as long as at least two of the three inputs to these circuits are supplied from skew fault detection circuits which have not failed and are operating properly. The voter circuits are designed so that if the input from the associated OR gate is at a high level due to only one of the skew fault detection circuits that are coupled to the OR gate being stuck at a high level, the voter circuit will still function, providing neither of the outputs of the skew fault detection circuits that are directly coupled to the voter circuit are also stuck at a high level. Similarly, if only one of the skew fault detection circuits that is directly coupled to the voter circuit is stuck at a high level, as long as neither of the skew fault detection circuits that is coupled to the associated OR is also stuck at a high level, the voter circuit will still function properly.

The voter circuits are used to detect when two of their associated skew fault detection circuits have failed. This is accomplished by the response of the skew fault detection circuits to a skew fault signal which is sent by the control circuit 40 on the lines 62, 64, 88 and 90. When a voter circuit produces an indication that either clock A leads clock B, or clock B leads clock A, by more than an allowed amount, the skew fault is too great to be tolerated by the system, and substitute A and B clocks replace A and B clocks 66 and 68, respectively, as indicated by lines 96, 98 and 100. The ways by which this can be accomplished are well known to those skilled in the art. After clocks 92, 94 have replaced clocks 66 and 68, the Q output of the flip-flops that have been set will be maintained in a latched condition until a high logic level clear signal is supplied on the clear error line 17 that runs from the control circuit 40 to an input of all of the NOR gates 21. This clear signal is set upon completion of the clock substitution and allows for resetting of all of the flip-flops 24 when all of these flip-flops are operating properly. However, when two or more of the skew fault detection circuits that were set have failed such that their outputs from their Q output terminals remain stuck at a high level following the transmission of the clear signal from the control circuit, the control circuit is made aware of this through the skew fault control signal on the lines 62, 64, 88 and 90, and the circuit is then able to shut down the system and provide an indication of the failure of two or more of the skew fault detection circuits.

While a representative embodiment has been disclosed, it will be readily apparent to those skilled in the art that various modifications and implementations may be made within the teachings of the invention and the scope of the claims appended thereto. In particular, it will be readily apparent that the system may be extended to clock systems in which there are more than two clocks by replicating the required circuitry in a manner which will be obvious to those skilled in the art.

The invention claimed is:

1. A skew fault detecting circuit for detecting clock skew between a first clock pulse from a first clock pulse train and a second clock pulse from a second clock pulse train skew fault occurs when one of said first and second clock pulses leads the other of said first and second clock pulses by a predetermined duration comprising first and second D-type flip-flops that are both initially in the same first state, and each of which has a clock input and a data input and an output, wherein said clock inputs of both of said flip-flops are coupled to receive said one clock pulse and said data input of said first-flop is coupled to receive said another clock pulse, and further comprising logic circuit means having a first input coupled to the output of said first flip-flop and a second input coupled to the output of said second flip-flop and output coupled to data input of said second flip-flop, said logic circuit means being constructed so that said first flip-flop changes to its second state upon the occurrence of a said one clock pulse, said second flip-flop changes to its second state upon the occurrence of the next said one clock pulse, and said second flip-flop is locked-out from further changing its state until said second flip-flop receives an externally produced reset signal that is coupled to said second flip-flop from said logic circuit means.

2. A circuit as claimed in claim 1 further comprising time delay means coupled to receive said another clock pulse and to provide said another clock pulse to said data input of said first flip-flop after it has delayed said another clock pulses by a time determined by an allowable skew tolerance plus the nominal time it takes for said first flip-flop to change its state.

3. A skew fault detection system for detecting when either a first clock pulse leads a second clock pulse by a predetermined duration, or said second clock pulse leads said first clock by a predetermined duration, in a data processing system which comprises first and second independent identical clock means for respectively producing said first and second clock pulses, first and second identical operational means operating in a redundant manner wherein said first clock is coupled to said first operational means and said second clock is coupled to said second operational means, wherein said first and second operational means each have at least two fan-out outputs, and said skew fault detection system comprises a plurality of separate skew fault detection means equal in number to the total number of said fan-out outputs, each of which is associated with one of said fan-out outputs and which comprise first and second input terminals, said skew fault detection means being divided into first and second groups of skew fault detection means, each group of which comprises an equal number of said skew fault detection means, wherein said skew fault detection means of said first group are coupled to receive said first clock pulses from said first operational means on their first terminals, and said second clock pulses from said second operational circuit on their second terminals, and said skew fault detection means of said second group are coupled to receive said second clock pulses from said second operational means on their first terminals, and said first clock pulses from said first operational means on their second terminals and said skew fault detection means are each constructed with output terminals, and are constructed such that they detect whenever the said clock pulses that are applied to their first terminals have a timing difference with respect to the said clock pulses that are applied to their second terminals exceeds a predefined amount and that they provide an error signal on their output terminals upon any such occurrence.

4. A skew fault detection system as claimed in claim 3 that further comprises a first clock frequency reduction means coupled between said first clock means and said first group of said skew fault detection means and a second clock frequency reduction means coupled between said second clock means and said second group of skew fault detection means.

5. A skew fault detection system as claimed in claim 3 wherein said skew fault detection means comprises first, second, third, fourth, fifth, sixth, seventh and eighth fault detection means which are arranged such that said first, second, third and fourth skew fault detection means from a first group of skew fault detection means which are associated with said first operational means and said fifth, sixth, seventh and eighth skew fault detection means from a said second group of skew fault detection means which are associated with said second operational means, wherein said system further comprises, a first majority voting means which comprises an output, two inputs, one of which is coupled to an output terminal of said first skew fault detection means and the other of which is coupled to an output terminal of said second skew fault detection means, and a first OR gate having two inputs and an output, wherein one of said inputs of said first OR gate is coupled to the output terminal of said third skew fault detection means and the other of said inputs of said first OR gate is coupled to the output terminal of said fourth skew detection means and the output of said first OR gate is coupled to said third input of said first majority voting means, a second majority voting means which comprise an output and two inputs, one of which is coupled to an output terminal of said third skew fault detection means and the other of which is coupled to an output terminal of said fourth skew fault detection means, and a second OR gate having two inputs and an output, wherein one of said inputs of said second OR gate is coupled to the output terminal of said first skew fault detection means, and the other of said inputs of said second OR gate is coupled to the output terminal of said second skew fault detection means, and the output of said second OR gate is coupled to said third input of said second majority voting means, a third majority voting means which comprises an output, two inputs, one of which is coupled to an output terminal of said fifth skew fault detection means, and the other of which is coupled to an output terminal of said sixth skew fault detection means, and the other of said inputs of said eighth OR gate is coupled to the output terminal of said skew fault detection means, and the output of said first OR gate is coupled to said third input of said third majority voting means, a third input and a third OR gate having two inputs and an output, wherein one of said inputs of said third OR gate is coupled to the output terminal of said seventh skew fault detection means, a fourth majority voting means which comprises an output and two inputs, one of which is coupled to an output terminal of said seventh skew fault detection means, and the other of which is coupled to an output terminal of said eighth skew fault detection means, and a third input and a fourth OR gate having two inputs and an output, wherein one of said inputs of said fourth OR gate is coupled to the output terminal of said fifth skew fault detection means, and the other of said inputs of said second OR gate is coupled to the output terminal of said sixth skew fault detection means, and the output of said sixth OR gate is coupled to said third input of said fourth majority voting means, and control means coupled to the outputs of all of said majority voting means which provides periodically produced clear signals to all of said skew fault detection means and which determines that at least two of said skew fault detection means are simultaneously stuck at the same logic level when said at least two of said skew fault detection means fails to respond to said clear signals.

6. A skew fault detection system as claimed in claim 5 that further comprises a first clock frequency reduction means coupled between said first clock means and said first group of said skew fault detection means and a second clock frequency reduction means coupled between said second clock means and said second group of skew fault detection means.

7. A skew fault detection system as claimed in any of the claims 3, 4, 5 or 6 wherein each of said skew fault detection means comprises a circuit for detecting clock skew between one clock pulse and another clock pulse comprising first and second D-type flip-flops that are both initially in the same first state, and each of which has a clock input and a data input and an output, wherein said clock inputs of both of said flip-flops are coupled to receive said one clock pulse and said data input of said first flip-flop is coupled to receive said another clock pulse, and further comprising logic circuit means having a first input coupled to the output of said first flip-flop and a second input coupled to the output of said second flip-flop and output coupled to data input of said second flip-flop, said logic circuit means being constructed so that said first flip-flop changes to its second state upon the occurrence of a said one clock pulse, said second flip-flop changes to its second state upon the occurrence of the next said one clock pulse, and said second flip-flop is locked-out from further changing its state until said second flip-flop receives an externally produced reset signal that is coupled to said second flip-flop from said logic circuit means.

8. In a skew fault detecting system as claimed in claim 7 the improvement further comprising a time delay means coupled to receive said another clock pulses and to provide said another clock pulses to said data input of said first flip-flop after delaying said another clock pulses by a time determined by the allowable skew tolerance plus the nominal time it takes for the first flip-flop to change states.

* * * * *